US011210752B2

(12) United States Patent
Rowden et al.

(10) Patent No.: US 11,210,752 B2
(45) Date of Patent: Dec. 28, 2021

(54) REAL TIME TRAVEL CONTINGENCY SERVICE

(71) Applicant: International Business Machines Corporation, Armonk, NY (US)

(72) Inventors: Michael Rowden, Austin, TX (US); Sangeetha Srikanth, Austin, TX (US); Yvonne Young, Elgin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 167 days.

(21) Appl. No.: 16/022,044

(22) Filed: Jun. 28, 2018

(65) Prior Publication Data
US 2020/0005409 A1 Jan. 2, 2020

(51) Int. Cl.
*G06Q 50/14* (2012.01)
*G06Q 10/02* (2012.01)

(52) U.S. Cl.
CPC .......... *G06Q 50/14* (2013.01); *G06Q 10/025* (2013.01)

(58) Field of Classification Search
CPC ........ G06Q 10/02; G06Q 20/18; G06Q 30/02; G06Q 40/04; G06Q 10/1095; G06Q 10/063116; G06Q 10/063114; G06Q 10/06316; G06Q 10/06311; G06Q 10/20; G06Q 10/063112; G06Q 10/063118; G06Q 10/06312; G06Q 10/06315; G06Q 10/0633; G06Q 10/08355; G06Q 10/0836; G06Q 10/087; G06Q 10/1097; G06Q 30/0205; G06Q 50/10; G06Q 50/14; G06Q 10/025; G06Q 50/01; G06Q 30/0201; G06Q 30/0202; G06Q 40/08; G06Q 50/30;
(Continued)

(56) References Cited

U.S. PATENT DOCUMENTS 7,155,519 B2 * 12/2006 Lo .......................... G06Q 10/04
709/227
7,979,457 B1 * 7/2011 Garman ............. G06Q 30/0625
707/768
(Continued)

FOREIGN PATENT DOCUMENTS

CN 106254557 A 12/2016
WO WO 2017042644 A1 3/2017

OTHER PUBLICATIONS

R. Logesh, "Efficient User Profiling Based Intelligent Travel Recommender System for Individual and Group of Users", May 23, 2018, Springer, pp. 1018-1032 (Year: 2018).*
(Continued)

*Primary Examiner* — Michael P Harrington
*Assistant Examiner* — Jorge G Del Toro-Ortega
(74) *Attorney, Agent, or Firm* — Robert Shatto; Hye Jin Lucy Song; Heslin Rothenberg Farley & Mesiti PC

(57) ABSTRACT

Methods, computer program products, and systems are presented. The methods include, for instance: obtaining a travel plan of a user including one or more travel item. Success values of respective travel items are calculated based on respective preferences by the user for each travel item in respective SV categories. Real time data relevant to the travel items are acquired and success values are updated for any predicted changes to any travel items, as caused by the real time data. The changes and updated SV is produced to the user.

16 Claims, 8 Drawing Sheets

(58) Field of Classification Search
CPC ............. G06Q 10/109; G06Q 10/1093; G06Q 30/0204; G06Q 30/0625; G06Q 30/0631; G06Q 30/01; G06Q 30/0255; G06Q 50/20; G06Q 10/06313; G06Q 10/067; G06Q 20/3223; G06Q 30/0282; G06Q 30/0623; G06Q 10/06314; G06Q 10/10; G06Q 20/10; G06Q 20/108; G06Q 20/3278; G06Q 20/384; G06Q 30/0279; G06Q 30/0633; G06Q 30/0641; G06Q 40/02; G06Q 40/06; G06Q 50/00; G06Q 50/12; G06Q 50/22; G06Q 50/28; G06Q 10/00; G06Q 10/04; G06Q 10/047; G06Q 10/101; G06Q 10/103; G06Q 20/40; G06Q 20/405; G06Q 30/0226; G06Q 30/0242; G06Q 30/0261; G06Q 30/0269; G06Q 30/0271; G06Q 30/0273; G06Q 30/0601; G06Q 40/00; G06Q 50/02; G06Q 50/08; G06Q 50/265
See application file for complete search history.

(56) References Cited

U.S. PATENT DOCUMENTS

| | | | |
|---|---|---|---|
| 2003/0033301 A1* | 2/2003 | Cheng | G06F 16/9535 |
| 2003/0040946 A1 | 2/2003 | Sprenger et al. | |
| 2003/0050846 A1* | 3/2003 | Rodon | G06Q 30/0625 |
| | | | 705/26.62 |
| 2003/0204678 A1* | 10/2003 | Lee | H04L 67/04 |
| | | | 711/144 |
| 2005/0021424 A1 | 1/2005 | Lewis et al. | |
| 2008/0154630 A1* | 6/2008 | DeMarcken | G06Q 10/02 |
| | | | 705/2 |
| 2011/0301835 A1 | 12/2011 | Bongiomo | |
| 2013/0211265 A1* | 8/2013 | Bedingham | G16H 40/67 |
| | | | 600/483 |
| 2013/0268886 A1* | 10/2013 | Sureshkumar | |
| | | | G06Q 10/063116 |
| | | | 715/810 |
| 2013/0339341 A1 | 12/2013 | Fan et al. | |
| 2015/0046088 A1 | 2/2015 | Jang et al. | |
| 2016/0299713 A1* | 10/2016 | Lin | G06F 3/067 |
| 2017/0186112 A1* | 6/2017 | Polapala | G06Q 30/0631 |
| 2017/0255645 A1 | 9/2017 | Varoglu et al. | |
| 2018/0053121 A1 | 2/2018 | Gonzalez et al. | |
| 2018/0101800 A1* | 4/2018 | Lecue | G06F 16/252 |

OTHER PUBLICATIONS

P. Mell, et al. *"The NIST Definition of Cloud Computing"*, NIST Special Publication 800-145, Sep. 2011, Gaithersburg, MD.

* cited by examiner

400

```
L401:   May 4 flight at 9:00am
        from A City, AA State to B City, BB State
        (4.5 hours travel, no connections)
        with R Airline(open seating) for $150

L411:   May 6 flight at 12:00pm
        from B City, BB State to A City, AA State
        (4 hours travel, no connections)
        with R Airline (open seating) for $160

L421:   Stay from May 4 to May 6 at S Hotel
        (microwave, self-laundry, pool) for $250

L431:   May 5th ticket for C Show at 5:00pm for $90
              . . .
```

```
        SV calculation by categories:
L502:   Airlines: SV(No Preference) =0
L503:   Flight seat row: SV(open seating)=4
L504:   Flight seat location: SV(open seating)=3
L505:   Hotel brands: SV(No Preference) =0
L506:   Hotel Amenities: 11
            =Sum (SV(microwave)=5, SV(self-laundry)=4,
            SV(pool)=2)
L507:   Events: SV(show)=4
L508:   Mode of transportation: SV(flying)=4
L509:   Transportation start time: SV(morning)=4
L510:   Transportation end time: SV(afternoon)=4

L511:   SV Total: 53

Threshold Verification:
L522:   Airfare: $150 + $160 = $310
L523:   Hotel Price: $250
L524:   Events Price: $90
L525:   Transportation Hours: 4.5 hours
L526:   Number of connections: 0
L527:   Transportation expense: 0

L528:   Met Thresholds: 6 (Airfare, Hotel Price, Events Price,
        Transportation hours, Number of connections,
        Transportation expense)
L529:   Unmet Thresholds: 0 (None)
```

FIG. 5

REAL TIME TRAVEL CONTINGENCY SERVICE

TECHNICAL FIELD

The present disclosure relates to predictive analytics, and more particularly to methods, computer program products, and systems for enhancing travel experience by use of real time updates and customized evaluation scheme.

BACKGROUND

Conventional travel booking services provide ways to make reservation of individual travel items such as hotels, flights, events, rental cars, and tours. When users plan a travel with transportation, accommodation, and entertainment, users often need to visit multiple sites and book each travel item individually. After the travel items are booked, further service with the reservations are rarely available. In between the time of booking and the time of actual travel, or during the travel, users are required to follow up and check individual travel items for any changes with the provider, as well as any other factors that are likely to affect the individual travel items.

SUMMARY

The shortcomings of the prior art are overcome, and additional advantages are provided, through the provision, in one aspect, of a method. The method for providing a real time travel contingency service includes, for instance: obtaining, by one or more processor, a travel plan of a user including one or more travel item; calculating, by the one or more processor, a success value (SV) corresponding to the travel plan, based on how the user prefers each of the one or more travel item amongst choices from respective SV categories corresponding to each travel item; acquiring, by the one or more processor, real time data relevant to the one or more travel item in the travel plan; updating, by the one or more processor, the SV corresponding to the travel plan, according to any changes with the one or more travel item as being predicted based on the real time data from the acquiring; and producing, by the one or more processor, the changes and the updated SV corresponding to the travel plan to the user.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 4 depicts an exemplary travel plan, in accordance with one or more embodiments set forth herein;

FIG. 5 depicts a result of success value calculation and threshold verification for the exemplary travel plan of FIG. 4, in accordance with one or more embodiments set forth herein;

DETAILED DESCRIPTION

Figure 1:
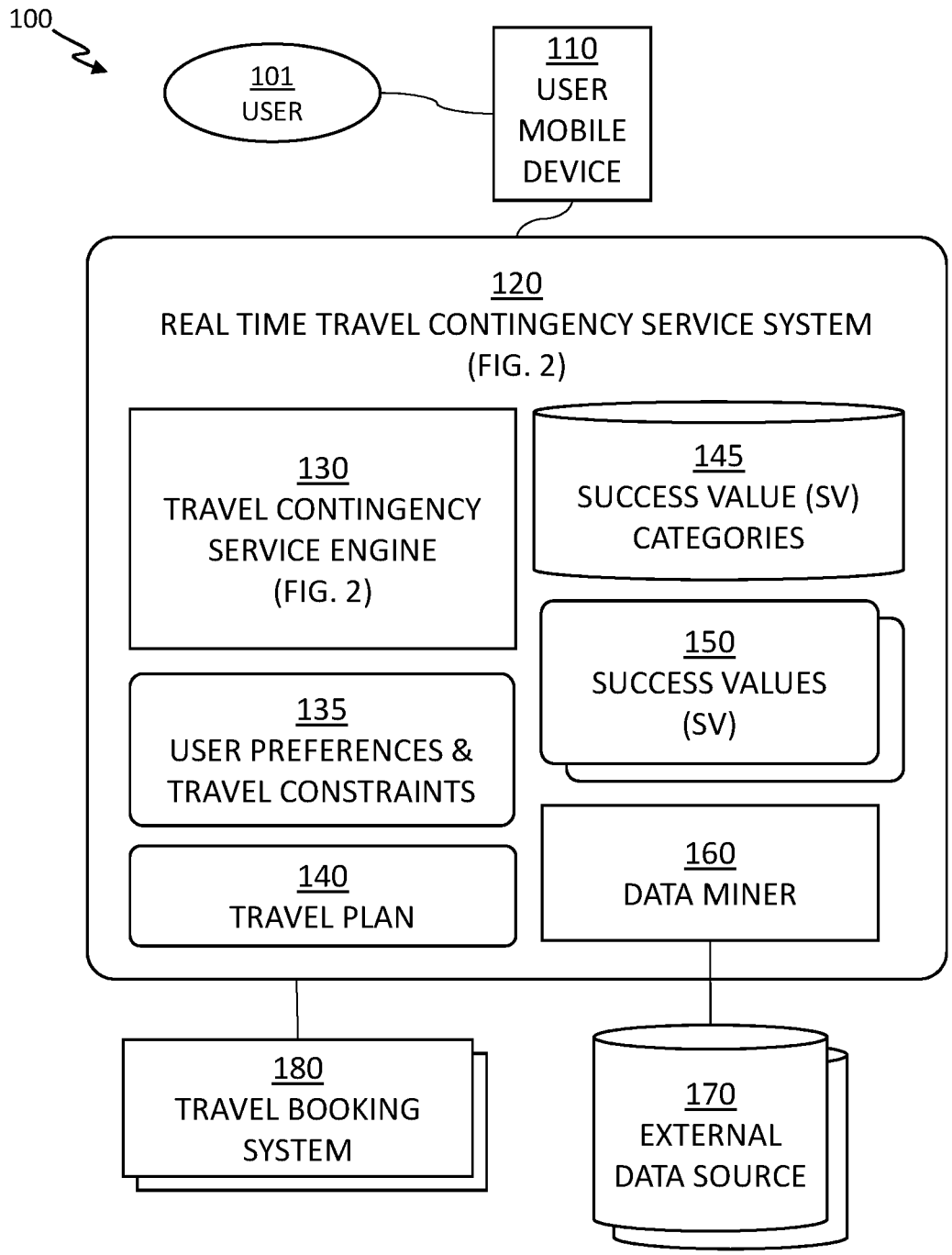
FIG. 1 depicts a system for real time travel contingency service, in accordance with one or more embodiments set forth herein.

FIG. 1 depicts a system 100 for real time travel contingency services, in accordance with one or more embodiments set forth herein.

Embodiments of the present invention recognizes that, with conventional travel booking services, users often need to visit and make reservation for individual travel items such as hotels, flights, events, rental cars, and tours, while planning a travel. With the conventional travel booking services, users need to select the items according to their schedule and conditions while making reservations for individual items to plan the trip. After the travel items are booked, the reservations are rarely available for cancellation and/or changes, and no further information on the reserved items are provided until the reserved date/time passes. Accordingly, users are left to deal with contingencies that affect the reserved travel items.

Also, with conventional travel booking services, the users will need to look out for local events and weather that may affect the travel plan. When the users need to purchase alternative travel items in a hurry, due to certain contingencies that affect a reserved travel item, the users may not have enough time and/or availability of travel items to buy, as most of travelers in the same area would seek similar alternative.

The system 100 for the real time travel contingency services includes a real time travel contingency service system 120, providing the real time travel services to a user 101 via a user mobile device 110.

The real time travel contingency service system 120 includes a travel contingency service engine 130, user preferences and travel constraints 135, a travel plan 140, success value (SV) categories 145, success values (SV) 150, and a data miner 160.

The travel contingency service engine 130 calculates the success values 150 of each travel item in the travel plan 140. The success values 150 of respective travel items are preconfigured according to the SV categories 145 and the user preferences and travel constraints 135. The success value 150 of a travel item is configured to quantify how the travel item is preferred by the user 101 as specified in the user preferences and travel constraints 135, in comparison with other comparable choices of the same success value category 145 as the travel item. Accordingly, a success value 150 of the travel plan 140 is a sum of success values corresponding to respective travel items appearing in the travel plan 140.

In certain embodiments of the present invention, the SV categories 145 are presented to the user 101 when the user 101 inputs values for the user preferences and travel constraints 135. For some SV categories, the user 101 orders choices in a SV category 145 from the most preferred choice to the least preferred choice, and the respective success values corresponding to the choices are assigned accordingly. In certain embodiments of the present invention, the real time travel contingency service system 120 assigns respective success values to the ordered choices within a SV category in a reverse order of preferences. Where the SV category has N number of choices, the real time travel contingency service system 120 assigns the success value of N to the most preferred choice in the SV category, and then decrease the success value by one (1) for less preferred choices in the SV category, which result in $$SV(choice_k)=(N-k+1),$$

where $choice_k$ indicates a choice at k-th place in the order of preference amongst choices in the SV category, N and k are respective positive integers, and, k=[1 . . . N]. Where the user 101 marks the SV category 145 with "No preference", then the real time travel contingency service system 120 assigns the success value of zero (0) to the category, such that the travel contingency service engine 130 can bypass the success value calculation for the SV category.

Certain SV categories may be more significant than other SV categories to the user 101, and the travel contingency service engine 130 can receive inputs on preferences amongst the SV categories from the user 101. When preferences by the user 101 over the SV categories 145 are expressed, choices in a preferred SV category are weighed more than choices of a less preferred SV category in calculating success values of the choices.

Each travel item is to meet applicable travel constraints that had been specified in the user preferences and travel constraints 135. The user preferences and travel constraints 135 include, but are not limited to, a preferred travel schedule, a preferred mode of transportation, a preferred hotel brand/grade, a preferred entertainment, a number of travelers and respective ages, a number of expense constraints per travel item, daily limit on hours on transportation, or the like.

The data miner 160 monitors external data source 170 for any data potentially affecting any travel item in the travel plan 140. Data potentially affecting the items in the travel plan is related to weather, natural disaster, road closures, major accidents, fire/police emergencies, construction projects, and/or area events, in the areas associated with the travel plan 140. Examples of the external data source 170 include, but are not limited to, local news/weather, social network/website postings by providers of reserved travel items of the travel plan 140. The data miner 160 also periodically polls for updates by respective providers of the reserved travel items in the travel plan 140, such as airlines, hotels/resorts, theaters, museums, and theme parks.

According to the data from the external data source 170, the travel contingency service engine 130 predict probabilities of flight cancellations, hotel closures, or any other change of one of the reserved items, and/or how local ground transportation/scheduled events/booked tours shall be affected. The travel contingency service engine 130 can inform the user 101, in place of suggesting alternative travel items, to prepare for the travel items existing in the travel plan 140, such as informing a forecast of rain/shower for a reserved outdoor activity, and advising the user 101 to have umbrellas, raincoats, and/or swap with other indoor activity scheduled for another day in the travel plan 140. Also, for example, the travel contingency service engine 130 can inform the user 101 for an extended stay in a hotel in which the user 101 is currently staying with pricing and availability, in case of a likely flight cancellation and/or delay in case of a severe weather condition.

In one embodiment of the present invention, the travel contingency service engine 130, by use of the data miner 160, pulls data on local weather in places of flight departure and arrival, local news at travel destinations, calendar updates by a hotel, a restaurant, a rental car, and a theater for respective reservations. The data miner 160 may further provide data on certain alternative travel items that replaces reserved travel items in the travel plan 140 or otherwise compensates any changes in the schedule of the reserved travel item. For example, when the travel contingency service engine 130 discovers and/or predicts that a flight in the travel plan 140 will be delayed for more than 12 hours due to the severe weather at the place of arrival, according to the weather data collected by the data miner 160, then the travel contingency service engine 130 also pulls, from the data miner 160, availability data of nearby hotels and inns in which the user 101 can rest until the delayed departure time of the flight, and informs the user 101 to make a reservation promptly before the airliner announces the delay, as configured in the user preferences and travel constraints 135.

The real time travel contingency service system 120 is coupled to one or more travel booking system 180. In certain embodiments of the present invention, the travel contingency service engine 130 obtains the travel plan 140 from the travel booking system 180. In other embodiments of the present invention, the travel contingency service engine 130 generates the travel plan 140 based on the user preferences and travel constraints 135.

Figure 2:
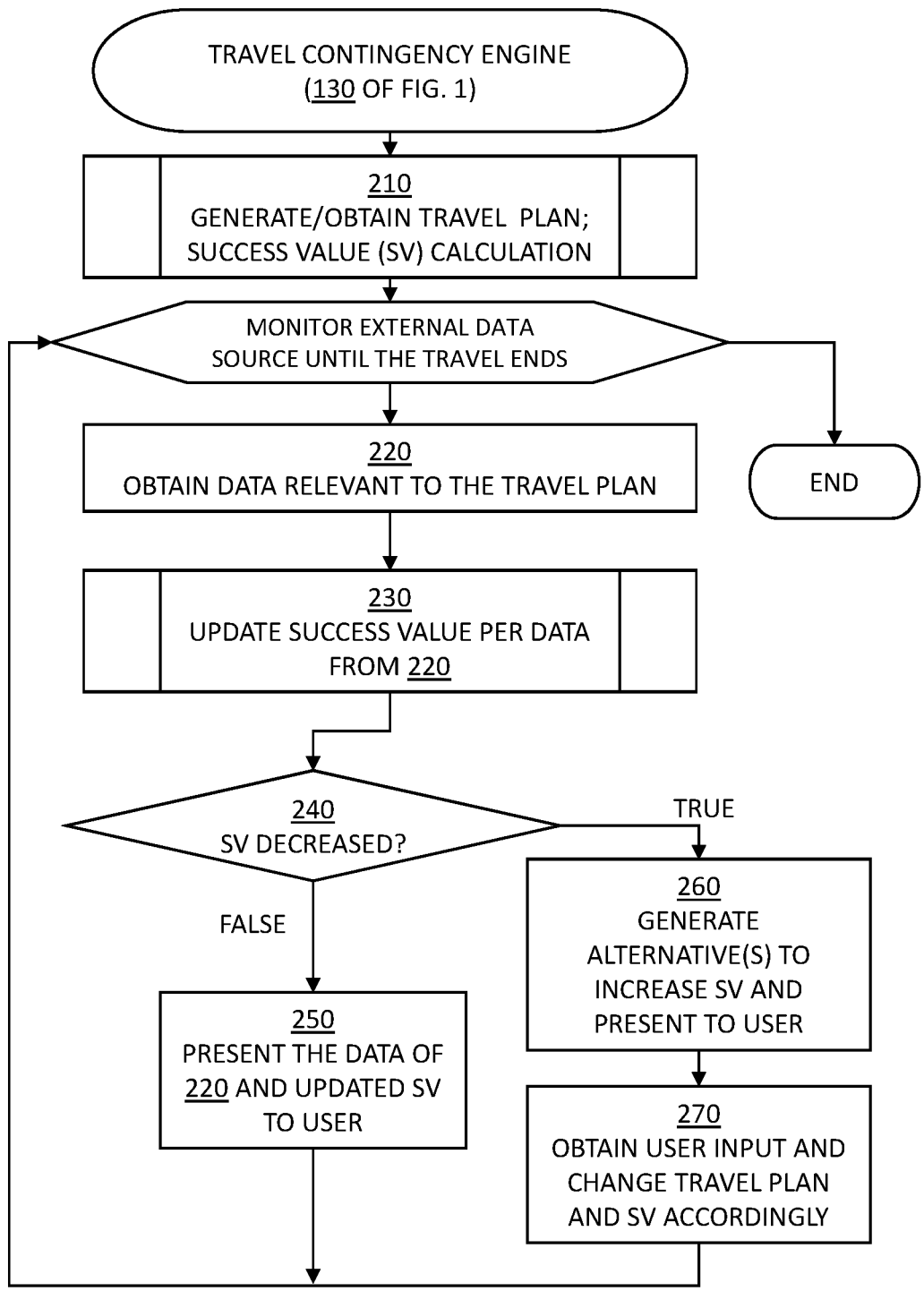
FIG. 2 depicts a flowchart of operations performed by the travel contingency service engine, in accordance with one or more embodiments set forth herein.

FIG. 2 depicts a flowchart of operations performed by the travel contingency service engine 130, in accordance with one or more embodiments set forth herein.

Prior to block 210, the travel contingency service engine 130, or a separate process of the real time travel contingency service system 120, configures the user preferences and travel constraints 135 by interactive inputs from the user 101 and/or a user profile as set by the user 101 upon registering for the real time travel contingency service. In certain embodiments of the present invention, the user preferences and travel constraints 135 is configured for each person in a group of travelers, including individual age and other demographic data to assess travel needs, and the preferences are set by predetermined criteria including, but not limited to, age appropriate activities, food constraints and preferences such as preferred cuisine, food allergies, and other dietary needs, individual preferred modes of transportation, a tolerance of weather conditions for outdoor activities, another tolerance of weather conditions for transportations, flexibility with schedule changes for the travel plan 140 that is applicable for generating alternative travel items, a range of budget for individual travel items and/or for the entirety of the plan, and a focal interest of the travel. The user preferences and travel constraints 135 also can be configured for the types of real time updates that the user 101 wishes to receive or not, before and during a travel according to the travel plan 140. Accordingly, in the same embodiments, certain preference/constraint items are associated with respective checkboxes that can turn on/off real time updates of the corresponding preference/constraint items. The user preferences and travel constraints 135 also can be configured for how often the user 101 wishes to be informed about what kind of contingencies, and/or for which types of impact that the user 101 wishes to be notified. For example, the user 101 wishes to be notified with data that is likely to affect any details of a booked event, which is the purpose of the trip, but does not wish to be notified with restaurants and hotels, unless respective reservations have been cancelled. In the same example, the user 101 accordingly turns on all updates from the host of the event, local road conditions/traffic near the venue of the event, weather on the date of the event, or the like, but not the same details on hotels and restaurants.

In block 210, the travel contingency service engine 130 generates or obtains the travel plan 140, including one or more reservation for a respective travel item. Examples of the travel item include, but are not limited to, flight, hotel, event, rental car, transportation, tour, shows, etc. The travel contingency service engine 130 calculates a success value 150 of the travel plan 140 by adding success values respective to travel items in the travel plan 140. The success values for each travel item are preconfigured in the success value (SV) categories 145, according to the user references and the travel constraints 135. Then, the travel contingency service engine 130 proceeds with block 220.

In certain embodiments of the present invention, the travel contingency service engine 130 obtains the travel plan 140 from the one or more travel booking system 180 as the user 101 makes reservations and/or otherwise books a trip, during which the user 101 manually applies the user references and the travel constraints 135. The travel contingency service engine 130 subsequently calculates the SV of the obtained travel plan 140, by adding the success values respective to travel items in the obtained travel plan 140.

In other embodiments of the present invention, the travel contingency service engine 130 generates the travel plan 140 based on the user preferences and travel constraints 135 by use of the travel booking system 180. Each items of the user preferences and travel constraints 135 have a respectively corresponding SV categories 145, and the travel contingency service engine 130 calculated the SV of the travel plan 140, by adding the success values respective to travel items in the travel plan 140, prior to, during, or after generating the travel plan 140.

The travel contingency service engine 130 performs blocks 220 through 270 as a unit to monitor the external data sources 170 for travel related data until the travel ends.

In block 220, the travel contingency service engine 130 obtains data relevant to the travel plan 140 from the external data sources 170 by use of the data miner 160. Then, the travel contingency service engine 130 proceeds with block 230.

In certain embodiment of the present invention, the relevancy of a certain piece of data and a travel item in the travel plan 140 is determined based on, including but not limited to, a time frame of the travel item, a location of the travel item, a travel route taken by the user 101 for the travel item, local news and weather of the location, and a provider update associated with the respective travel items, as well as choices from the same SV category as the travel item and corresponding success values.

Where the data miner 160 is disconnected from the external data sources 170, and/or the user mobile device 110 is disconnected from the travel contingency service engine 130, the travel contingency service engine 130 synchronizes the data with external data sources 170 by pulling from the data miner 160, and with the user mobile device 110 by pushing the data pulled from the data miner 160 as soon as the connections are recovered, and informs the user 101 of the data with marking a delay. For example, where the travel contingency service engine 130 connects with the user mobile device 110 after a local power outage for an hour, during which no communication network had been available, the travel contingency service engine 130 can send an update with a time stamp.

In block 230, the travel contingency service engine 130 updates a success value (SV) corresponding to a travel item in the travel plan 140, if the travel item is affected by the data from block 220. The travel contingency service engine 130 also updates the SV of the travel plan 140 accordingly, if the success value has changed from a previous instance. Then, the travel contingency service engine 130 proceeds with block 240.

In certain embodiments of the present invention, the data can be associated with more than one travel item in the travel plan 140. The travel contingency service engine 130 examines if there are more than one data updates interrelated with one another upon obtaining the relevant data in block 220. In block 230, the travel contingency service engine 130 checks if some of the data obtained in bock 220 is on an alternative travel item to one preexisting in the travel plan 140, then, the travel contingency service engine 130 also calculates a success value corresponding to the alternative travel item, as well as a new success value of the preexisting travel item as affected by the data from block 220.

In block 240, the travel contingency service engine 130 determines whether or not the updated SV from block 230 is less than the SV of the travel item from block 210, indicating that the travel item had been negatively affected by the data from block 220. If the travel contingency service engine 130 determines that the SV had not been decreased, then the travel contingency service engine 130 proceeds with block 250. If the travel contingency service engine 130 determines that the SV had been decreased due to the data from block 220, then the travel contingency service engine 130 proceeds with block 260.

Examples of data updates that increase the success value of the travel plan, or a corresponding travel item, include, but are not limited to, an availability update indicating that a hotel favored by the user 101 that had not been previously unavailable becomes available for the same nights, an event ticket status update indicating that an event preferred by the user 101 to a currently reserved event became available for purchase. Examples of data updates that decrease the success value of the travel plan, or the corresponding travel item, include, but are not limited to, a severe weather forecast and likely cancellation of flight, a cancellation of booked event.

In block 250, the travel contingency service engine 130 presents to the user 101 the data from block 220 and the SV of the travel item as updated by the data from block 220. As determined in block 240, the SV has not been decreased from the SV of block 210, indicating that a change caused by the data from block 220 did not negatively impact the affected travel item, either by improving the travel item, or by replacing the travel item with another travel item that is preferred by the user 101, and accordingly, has a greater SV value than the affected travel item. The user 101 optionally acknowledges the data and the updated SV of the travel item in order to update the travel plan with the presented replacement travel item. Then, the travel contingency service engine 130 loops back to block 220 for any further data relevant to the travel plan as adjusted.

In block 260, the travel contingency service engine 130 generates one or more alternative travel item that can replace the travel item with the decreased SV, which also has a higher SV than the decreased SV. The travel contingency service engine 130 presents the generated alternative to the user 101 for an input. Then, the travel contingency service engine 130 proceeds with block 270.

In certain embodiments of the present invention, the travel contingency service engine 130 generates the one or more alternative travel item by searching the service value categories for alternative travel items in the same SV category as the negatively affected travel item and by selecting other travel items having respective success values greater than or equal to the decreased success value. In the same embodiments of the present invention, the travel contingency service engine 130 can also generate the one or more alternative travel item based on the data received in block 220, as used for updating the success value in block 230 which results in an increased success value.

In certain embodiments of the present invention, the travel contingency service engine 130 generates the one or more alternative item by searching the service value categories for alternative travel items in the same SV category as the negatively affected travel item, by selecting travel items having respective success values greater than or equal to the decreased success value, and then by checking the selected travel items as an alternative to the negatively affected travel item, against the user preferences and travel constrains 135 that had been applied to the negatively affected travel item.

In block 270, the travel contingency service engine 130 obtains one or more user input updating the travel plan, including a user input selecting the alternative travel item as a replacement for the negatively affected item. The travel contingency engine 130 changes the travel plan by canceling the negatively affected item and making reservation for the selected alternative travel item, or by replacing the negatively affected item in the travel plan with the selected alternative travel item. Then, the travel contingency service engine 130 loops back to block 220 for any further data relevant to the travel plan as adjusted.

Figure 3:
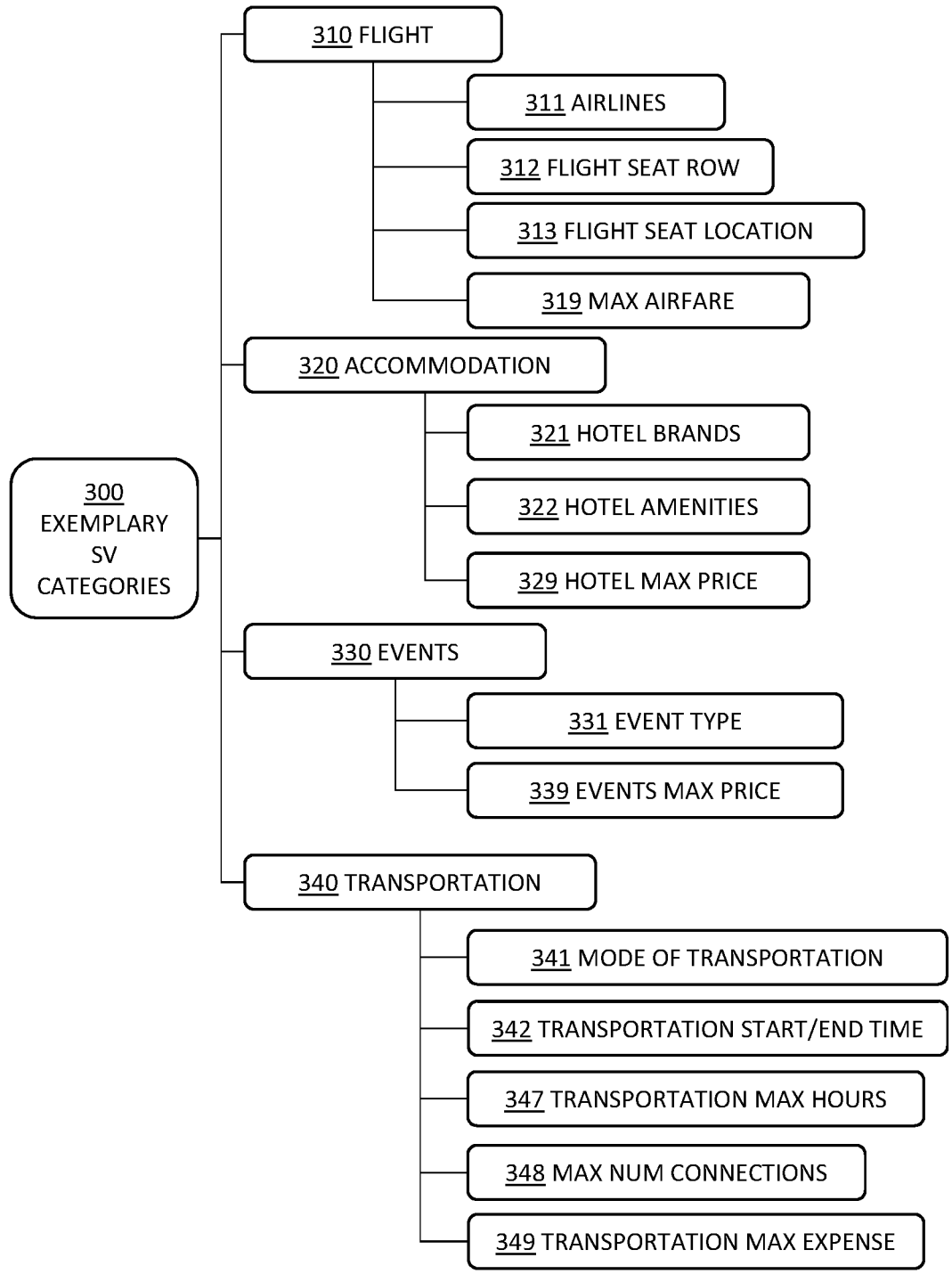
FIG. 3 depicts an exemplary SV categories of the success value (SV) categories in FIG. 1, in accordance with one or more embodiments set forth herein.

FIG. 3 depicts an exemplary SV categories 300 of the success value (SV) categories 145 of FIG. 1, in accordance with one or more embodiments set forth herein.

In one embodiment of the present invention, the SV categories 145 of the real time travel contingency service system 120 are implemented as shown in the exemplary SV categories 300. The exemplary SV categories 300 include a flight 310, an accommodation 320, events 330, and a transportation 340. As noted, the SV categories are used to quantify how well respective travel items in the travel plan 140 suit the user preferences and travel constraints 135 of a specific user who is being served with the real time travel contingency service as presented herein.

The user preferences and travel constraints 135 had been previously provided by an exemplary user, User Q. The exemplary SV categories 300 have success value instances for each SV category and choices in the respective SV categories, corresponding to the preferences of User Q. For example, if User Q prefers item X to item Y in a SV category C, success value of X is greater than success value of Y within the SV category C. Also amongst SV categories, User Q can set a SV category C1 to be more significant than another SV category C2, thus the success values for all choices in the SV category C1 can be scaled up in comparison to the success values for all choices in the SV category C2. In preparation of providing the real time travel contingency service for User Q, the real time travel contingency service system 120 configures the respective instances of the SV categories 145 according to the user preferences and travel constraints 135 of User Q.

If a user prefers a certain choice within each SV category, then the user will set the preferences amongst the choices by ordering the choices by use of a user interface for setting the user preferences and travel constraints 135. Each SV category has a choice of "No preference", which represents the user has no preference from one choice to another within the SV category. Where a user selects No preference choice for a SV category, then the travel contingency service engine 130 assigns the success value of zero (0) to the SV category, indicating that the travel contingency service engine 130 does not take the SV category into account in assessing the success value of the travel plan (SV). The SV categories will also have respective threshold values to apply to any alternatives when the travel contingency service engine 130 makes suggestions to replace a travel item in the travel plan 140. If no alternative is available within the threshold condition, then the travel contingency service engine 130 optionally employ the threshold value of a certain SV category as a guideline, such that the travel contingency service engine 130 can select an alternative that is close to the threshold condition with a notice that the suggested alternative does not meet the threshold of the corresponding SV category.

The flight 310 category has three (3) subcategories representing user preferences including an airlines subcategory 311, a flight seat row subcategory 312, and a flight seat location subcategory 313, and a constraint on the expense of a flight, referred to as a maximum airfare threshold 319, in the exemplary SV categories 300.

In the same embodiment of the present invention, the airlines subcategory 311 has three (3) choices for users to choose from, including Airline A, Airline B, Airline C, and No preference. If the user 101 orders the choices from the most preferred airline to the least preferred airline, then the choices are assigned with respective SVs of [1 . . . 3], three (3) for the most preferred airline, and one (1) for the least preferred airline. If the user 101 marks that the user 101 has no preference amongst the airlines choices, then the real time travel contingency service system 120 sets the SV of the airlines subcategory 311 as zero (0).

In the same embodiment of the present invention, the flight seat row subcategory 312 has four (4) choices for users to choose from, including Front, Middle, Back, Open seating, and No preference. If the user 101 orders the choices from the most preferred flight seat row to the least preferred row, then the choices are assigned with respective SVs of [1 . . . 4], four (4) for the most preferred row, and one (1) for the least preferred row. If the user 101 marks that the user 101 has no preference amongst the flight seat row choices, then the real time travel contingency service system 120 sets the SV of the flight seat row subcategory 312 as zero (0).

In the same embodiment of the present invention, the flight seat location subcategory 313 has four (4) choices for users to choose from, including Isle, Middle, Window, Open seating, and No preference. If the user 101 orders the choices from the most preferred flight seat to the least preferred flight seat, then the choices are assigned with respective SVs of [1 . . . 4], four (4) for the most preferred seat, and one (1) for the least preferred seat. If the user 101 marks that the user 101 has no preference amongst the flight seat choices, then the real time travel contingency service system 120 sets the SV of the flight seat location subcategory 313 as zero (0).

In the same embodiment of the present invention, the maximum airfare threshold 319 is set with a threshold amount of the user 101 intend to spend for a flight. The travel contingency service engine 130 applies the value of the maximum airfare threshold 319 as a travel constraint when searching and/or selecting a flight travel item for the travel plan 140, or when making suggestions for an alternative flight to a reserved flight in the travel plan 140 in case of contingencies including delays, cancellation, and any other emergencies.

The accommodation 320 category has two (2) subcategories representing user preferences including a hotel brands subcategory 321 and a hotel amenities subcategory 322, and a constraint on the expense of an accommodation, referred to as a hotel max price threshold 329, in the exemplary SV categories 300.

In the same embodiment of the present invention, the hotel brands subcategory 321 has four (4) choices for users to choose from, including Hotel H, Hotel I, Hotel J, Hotel K, and No preference. If the user 101 orders the choices from the most preferred hotel brand to the least preferred hotel brand, then the choices are assigned with respective SVs of [1 . . . 4], four (4) for the most preferred hotel brand, and one (1) for the least preferred hotel brand. If the user 101 marks that the user 101 has no preference amongst the hotel brand choices, then the real time travel contingency service system 120 sets the SV of the hotel brands subcategory 321 as zero (0).

In the same embodiment of the present invention, the hotel amenities subcategory 322 has five (5) choices for users to choose from, including Pool, Gym, Sauna, Self-laundry, Microwave oven in room, and No preference. If the user 101 orders the choices from the most preferred amenity to the least preferred amenity, then the choices are assigned with respective SVs of [1 . . . 5], five (5) for the most preferred amenity, and one (1) for the least preferred amenity. If the user 101 marks that the user 101 has no preference amongst the amenities provided in a hotel, then the real time travel contingency service system 120 sets the SV of the hotel amenities subcategory 322 as zero (0).

In the same embodiment of the present invention, the hotel max price threshold 329 is set with a threshold amount of the user 101 intend to spend for a stay in a hotel. The travel contingency service engine 130 applies the value of the hotel max price threshold 329 as a travel constraint when searching and/or selecting a hotel travel item for the travel plan 140, or when making suggestions for an alternative hotel to a reserved hotel in the travel plan 140 in case of contingencies including change of a schedule, cancellation, and any other emergencies.

The events 330 category has one (1) subcategory representing user preferences including an event type subcategory 331, and a constraint on the expense of an event, referred to as events max price threshold 339, in the exemplary SV categories 300.

In the same embodiment of the present invention, the event type subcategory 331 has five (5) choices for users to choose from, including Shows, Movies, Attractions, Shopping/Dining, and Theme parks. The event type subcategory 331 also has No preference option, by which the user skips ordering the event choices by preference within the event type subcategory 331. If the user 101 orders the choices from the most preferred type of event to the least preferred type of event, then the choices are assigned with respective SVs of [1 . . . 5], five (5) for the most preferred type of event, and one (1) for the least preferred type of event. If the user 101 marks that the user 101 has no preference amongst the types of events, then the real time travel contingency service system 120 sets the SV of the event type subcategory 331 as zero (0).

In the same embodiment of the present invention, the event max price threshold 339 is set with a threshold amount of the user 101 intend to spend for an event and/or for entertainment. The travel contingency service engine 130 applies the value of the event max price threshold 339 as a travel constraint when searching and/or selecting an event travel item for the travel plan 140, or when making suggestions for an alternative event to a reserved event in the travel plan 140 in case of contingencies including change of a schedule, cancellation, and any other emergencies.

The transportation category 340 in the exemplary SV categories 300 has two (2) subcategories representing user preferences including a mode of transportation subcategory 341 and a transportation start/end time 342. The transportation category 340 has three (3) constraints including a transportation maximum hours threshold 347 indicating a limit on number of hours per day for transportation, a maximum number of connections threshold 348 indicating a limit on the number of connection for a method of transportation, and a transportation maximum expense threshold 349 indicating a limit on the expense of transportation that had not been accounted in the flight category 310.

In the same embodiment of the present invention, the mode of transportation subcategory 341 has four (4) choices for users to choose from, including Flying, Driving, Train, and Bus. The mode of transportation subcategory 341 also has No preference option, by which the user skips ordering the transportation choices by preference within the mode of transportation subcategory 341. If the user 101 orders the choices from the most preferred type of transportation to the least preferred type of transportation, then the choices are assigned with respective SVs of [1 . . . 4], four (4) for the most preferred type of transportation, and one (1) for the least preferred type of transportation. If the user 101 marks that the user 101 has no preference amongst the types of transportation, then the real time travel contingency service system 120 sets the SV of the mode of transportation subcategory 341 as zero (0).

In the same embodiment of the present invention, the transportation start/end time subcategory 342 has four (4) choices for users to choose from, including Morning, Afternoon, Night, and Redeye. The transportation start/end time subcategory 342 also has No preference option, by which the user skips ordering the preferred time of day to start and to end transportation, as provided within the transportation start/end time subcategory 342. In the transportation start/end time subcategory 342, the user 101 selects a combination of two (2) choices, indicating a start time and an end time for transportation. If the user 101 orders the choices from the most preferred timeframe for transportation to the least preferred timeframe for transportation, then the choices are assigned with respective SVs of [2 . . . 8], eight (8) for the most preferred timeframe for transportation having both the most preferred start time out of four (4) choices and the most preferred end time out of four (4) choices, having the respective success value of four (4), and two (2) for the least preferred timeframe for transportation, having a combination of the least preferred start time and the least preferred end time, having the respective success value of one (1). If the user 101 marks that the user 101 has no preference amongst the timeframe for transportation, then the real time travel contingency service system 120 sets the SV of the transportation start/end time subcategory 342 as zero (0).

FIG. 4 depicts an exemplary travel plan 400, in accordance with one or more embodiments set forth herein.

The exemplary travel plan 400 is one example of the travel plan 140 of FIG. 1. In the example shown in FIG. 4, User Q books a travel as presented in the exemplary travel plan 400 by use of one of the travel booking system 180. In registering for the travel contingency service, User Q sets the user preferences and travel constraints 135 according to the exemplary SV categories 300 of FIG. 3.

Line L401 represents that User Q booked a first flight departing A City, AA State on May 4$^{th}$ at 9:00 a.m. to B City, BB State with R Airline for $150. A seat arrangement of the first flight is an open seating, the length of the flight is four and a half (4.5) hours, without any transfers.

Line L411 represents that User Q booked a return flight departing B City, BB State on May 6$^{th}$ at 12:00 p.m. to A City, AA State with R Airline for $160. A seat arrangement of the return flight is an open seating, the length of the flight is four (4) hours, without any transfers.

Line L421 represents that User Q booked a stay from May 4$^{th}$ to May 6$^{th}$ for $250 at S Hotel, which has amenities of a microwave oven, a self-laundry, and a pool.

Line L431 represents that User Q also purchased a ticket for C show in B City, BB State, on May 5$^{th}$ at 5:00 p.m. for $90.

FIG. 5 depicts a listing 500 of success value calculation and threshold verification for the exemplary travel plan 400 of FIG. 4, in accordance with one or more embodiments set forth herein.

In the listing 500, the exemplary travel plan 400 of FIG. 4 is evaluated according to the user preference and travel constraints 135 as set by User Q, by use of the exemplary success value (SV) categories 300.

In the flight category 310, User Q expressed no preference with airlines subcategory 311, so the success value of airlines subcategory is zero, that is, SV(No preference)=0, for R Airline that User Q is using for the first flight and the return flight in the exemplary travel plan 400, as shown in line L502.

Line L503 indicates that User Q specified that the choice of Open seating for the flight seat row subcategory 312 is the most preferred choice in the flight seat row subcategory 312, which has a success value of four (4).

Line L504 indicates that User Q specified that the choice of Open seating for the flight seat location subcategory 313 is the second preferred choice amongst the choices in the flight seat location subcategory 313, which has a success value of three (3).

Line L505 indicates that, in the accommodation category 320, User Q expressed no preference with the hotel brands subcategory 321, so the success value of the hotel brands subcategory 321 is zero, that is, SV(No preference)=0, for S Hotel that User Q is using for the stay.

In the user preferences and travel constraints 135, User Q selected the microwave choice as the most preferred, then the self-laundry choice, the gym choice, the pool choice, and the sauna choice as the least preferred. Accordingly, the respective success values of the respective choices are: SV(microwave)=5, SV(self-laundry)=4, SV(gym)=3, SV(pool)=2, and SV(sauna)=1.

Line L506 indicates that, in the hotel amenities subcategory 322, the success value is a sum of respective success values for all hotel amenities that is offered by the S Hotel that had been booked in the exemplary travel plan 400, which are microwave, self-laundry, and a pool. Accordingly, the success value for the hotel amenities subcategory 322 is equal to eleven (11), the sum of SV(microwave)=5, SV(self-laundry)=4, and, SV(pool)=2.

Line L507 indicates that User Q specified that the choice of Show for the event type subcategory 331 is the second preferred choice amongst choices in the event type subcategory 331, which has a success value of four (4).

Line L508 indicates that User Q specified that the choice of Flying for the mode of transportation subcategory 341 is the most preferred choice amongst choices in the mode of transportation subcategory 341, which has a success value of four (4).

Line L509 and line L510 indicate that User Q specified that the choice of Morning is the most preferred choice for the start time of the transportation start/end time subcategory 342, and that the choice of Afternoon is the most preferred choice for the end time of the transportation start/end subcategory 342, corresponding to respective success values of four (4).

Two transportation items in the exemplary travel plan 400 is the first flight and the return flight, in lines L401 and L411, respectively. Both flights have the most preferred open seating choice for the flight seat row subcategory 312, SV=4, and the second preferred open seating choice for the flight seat location subcategory 313, SV=3. Also both flights are the most preferred type of transportation, SV=4, and have the most preferred transportation start time, SV=4, and the most preferred transportation end time, SV=4. The success value of the first flight, denoted as flight1 below, is the sum of all success values associated with the first flight, which is:

$$SV(flight1)=4+3+4+4+4=19$$

Similarly, the success value of the return flight would be the sum of all success values associated with the return flight, which is equal to the first flight, nineteen (19).

Line L511 indicates that the total success value of the exemplary travel plan 400 is:

$$SV(travel\ plan)=\Sigma SV(travel\ item)=19+11+4+19=53$$

Lines L522 through L519 show how the exemplary travel plan 400 satisfies the thresholds 319, 329, 339, 347, 348, and 349, respectively, according to the instances set by User Q in the user preferences and travel constraints 135.

For the exemplary travel plan 400, User Q set the maximum airfare threshold 319 as four hundred dollars ($400), the hotel max price threshold 329 as three hundred and fifty dollars ($350), the events max price threshold 339 as one hundred dollars ($100), the transportation maximum hours threshold 347 as six (6) hours, the maximum number of connections threshold 348 as two (2), and the transportation maximum expense threshold 349 as one hundred and fifty dollars ($150).

Line L522 represents that the sum of expenses for both the first flight and the return flight, $310 is less than the maximum airfare threshold 319 that has been set as $400. Line L523 represents that the hotel expense of $250 in the exemplary travel plan 400 is less than the hotel max price threshold 329 set as $350. Line L524 represents that the events price of $90 in the exemplary travel plan 400 is less than the events max price threshold 339 set as $100. Line L525 represents that the longest hours spent for transportation, that is, 4.5 hours for the first flight, is less than the transportation maximum hours threshold 347 set as 6. Line L526 represents that the number of connections in any flight of the exemplary travel plan 400, that is, zero (0), is less than the maximum number of connections threshold 348 set as two (2). Line L527 represents that there is no transportation expense additional to the airfare, and accordingly, the transportation expense is less than the transportation maximum expense threshold 349 set as $150.

Lines L528 and L529 respectively represent a summary of the thresholds 319, 329, 339, 347, 348, and 349. Line L528 represents a number of instances/values from the exemplary travel plan 400 in respective SV categories that had met corresponding thresholds, and a list of the met thresholds.

Line L529 represents a number of instances/values from the exemplary travel plan 400 in respective SV categories that had not met corresponding thresholds, and another list of the unmet thresholds.

For example, in one occasion during the operations of the real time travel contingency service system 120, the data miner 160 discovers that T Hotel, located in the same area as S Hotel that had been booked in the exemplary travel plan 400, offers amenities including microwave, self-laundry, gym, and pool for $260. The travel contingency service engine 130 obtains the data on T Hotel in block 220.

In block 230, the travel contingency service engine 130 updates the success value of the SV category of accommodation to fourteen (14) from eleven (11) for S Hotel, as increased by three (3) that is assigned for a gym choice newly available in T Hotel, resulting in the SV of the exemplary travel plan of fifty six (56). The travel contingency service engine 130 also checks the price of T Hotel, $260, against the hotel max price threshold 329 set as $350, and ascertains that T Hotel is an alternative to S Hotel as meeting the hotel max price threshold 329.

Subsequent to determining that the SV had not been decreased in block 240, the travel contingency service engine 130 proceeds with block 260 and generates a stay in T Hotel as an alternative to the stay in S Hotel, including the list of amenities and the prices of T Hotel, specifying that T Hotel also has a gym, which User Q had indicated as moderately preferred, in addition to all the amenities of S Hotel, with a price change of additional $10, and presents the alternative stay at T Hotel to User Q. In block 270, the travel contingency service engine 130 obtains an input, in which User Q accepts or declines the alternative stay at T Hotel. The travel contingency engine 130 updates the exemplary travel plan 400 and the corresponding SV according to the input.

For example, in another occasion during the operations of the real time travel contingency service system 120, the data miner 160 discovers a severe weather warning in B City, BB State on the date of the return flight, May 6$^{th}$, which leads to a high likelihood of the return flight being delayed and/or cancelled based on the past records. The travel contingency service engine 130 searches the external data source 170 for an alternative to the return flight, and discovers that a nearby K City, K State, has a flight available to A City, AA State. K City, K State is 2.5 hours of drive away from B City, BB State, and a rental car is available at $30 for the trip from B City to K City. The flight from K City, K State to A City AA State departs at 1:00 p.m. with 2 hours of flying time. The K City to A City flight is with T Airline, Open Seating, and is priced at $100.

The travel contingency service engine 130 updates the success values and checks the threshold values, then presents a new drive-then-fly trip in the alternative of the return flight due to the severe weather warning, with a notice that extra cost of $130 with the same 4.5 hours of travel to return to A City on time.

Certain embodiments of the present invention can offer various technical computing advantages, including customizing travel contingency services, as delivered by a user mobile device, according to preconfigured user preferences and travel constraints based on predictive analysis of real time data relevant to a travel plan. Certain embodiments of the present invention specifies and calculates success values of respective travel items in the travel plan, which quantifies how well the respective travel items in the travel plan suit the user preferences and travel constraints as set for a travel. Certain embodiments of the present invention can be implemented by use of a cloud platform/data center in various types including a Software-as-a-Service (SaaS), Platform-as-a-Service (PaaS), Database-as-a-Service (DBaaS), and combinations thereof based on types of subscription. The onboarding automation and performance optimization service can be provided for subscribed business entities in need from any location in the world.

Figure 6:
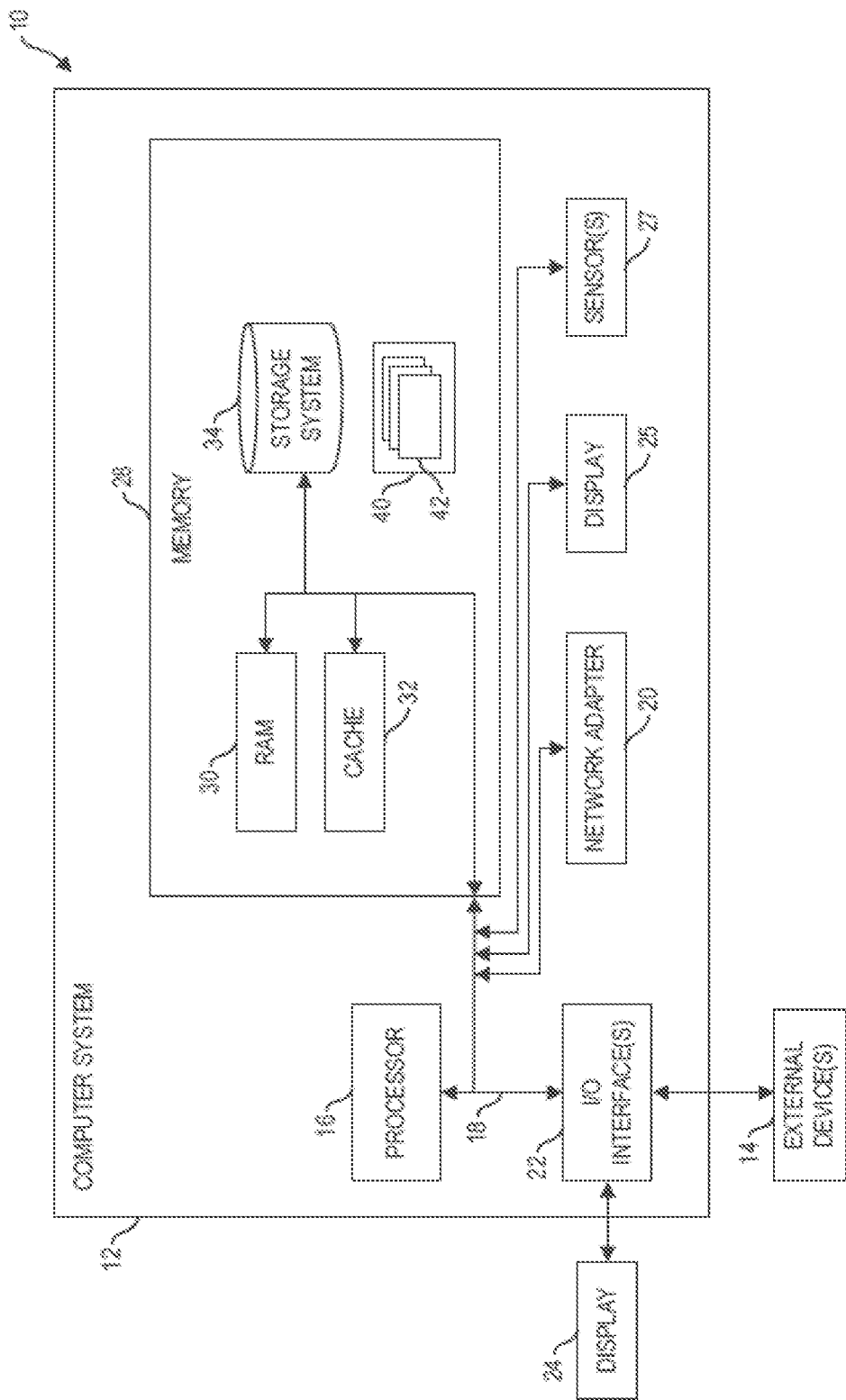
FIG. 6 depicts a cloud computing node according to an embodiment of the present invention.
Figure 7:
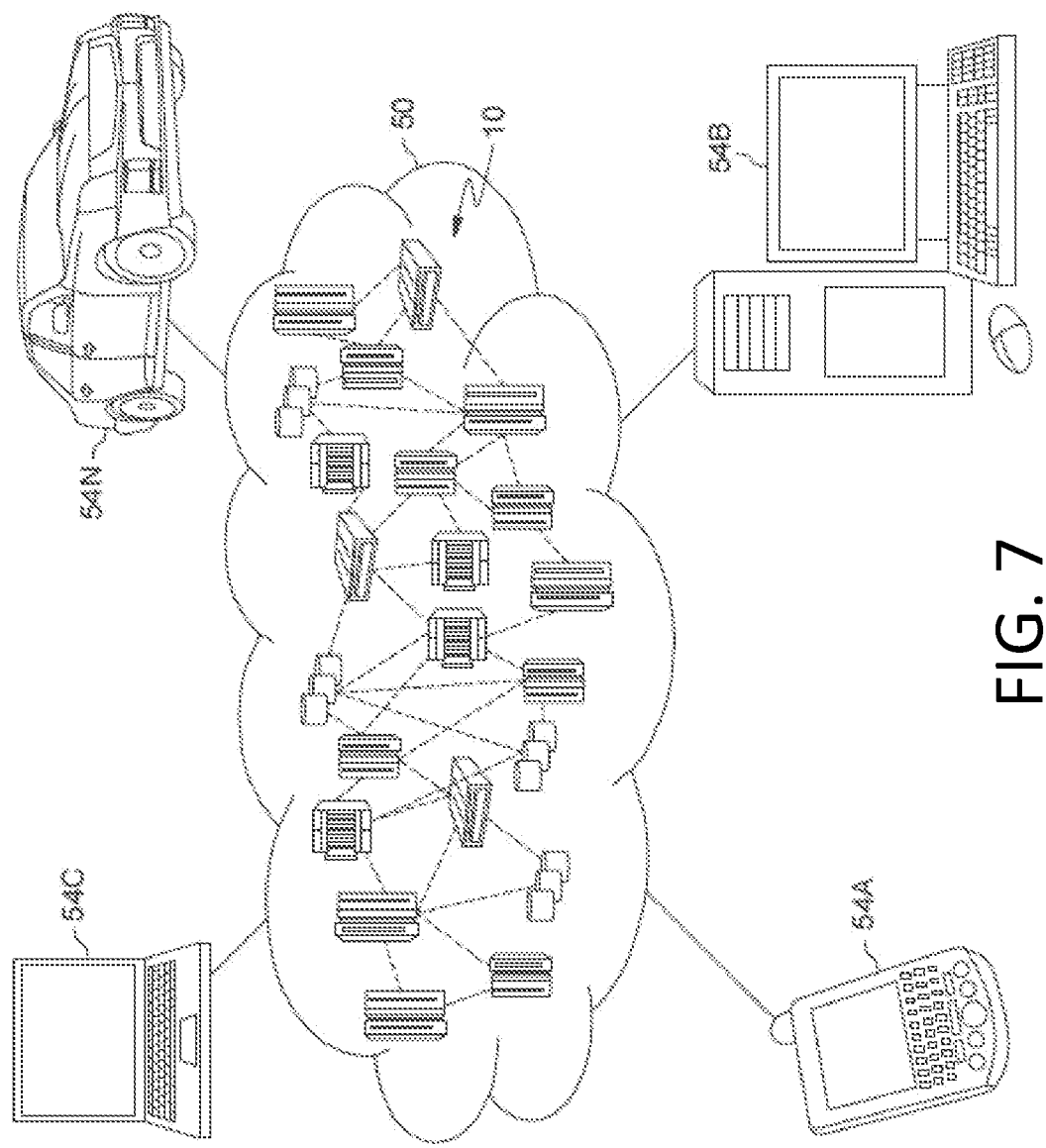
FIG. 7 depicts a cloud computing environment according to an embodiment of the present invention.
Figure 8:
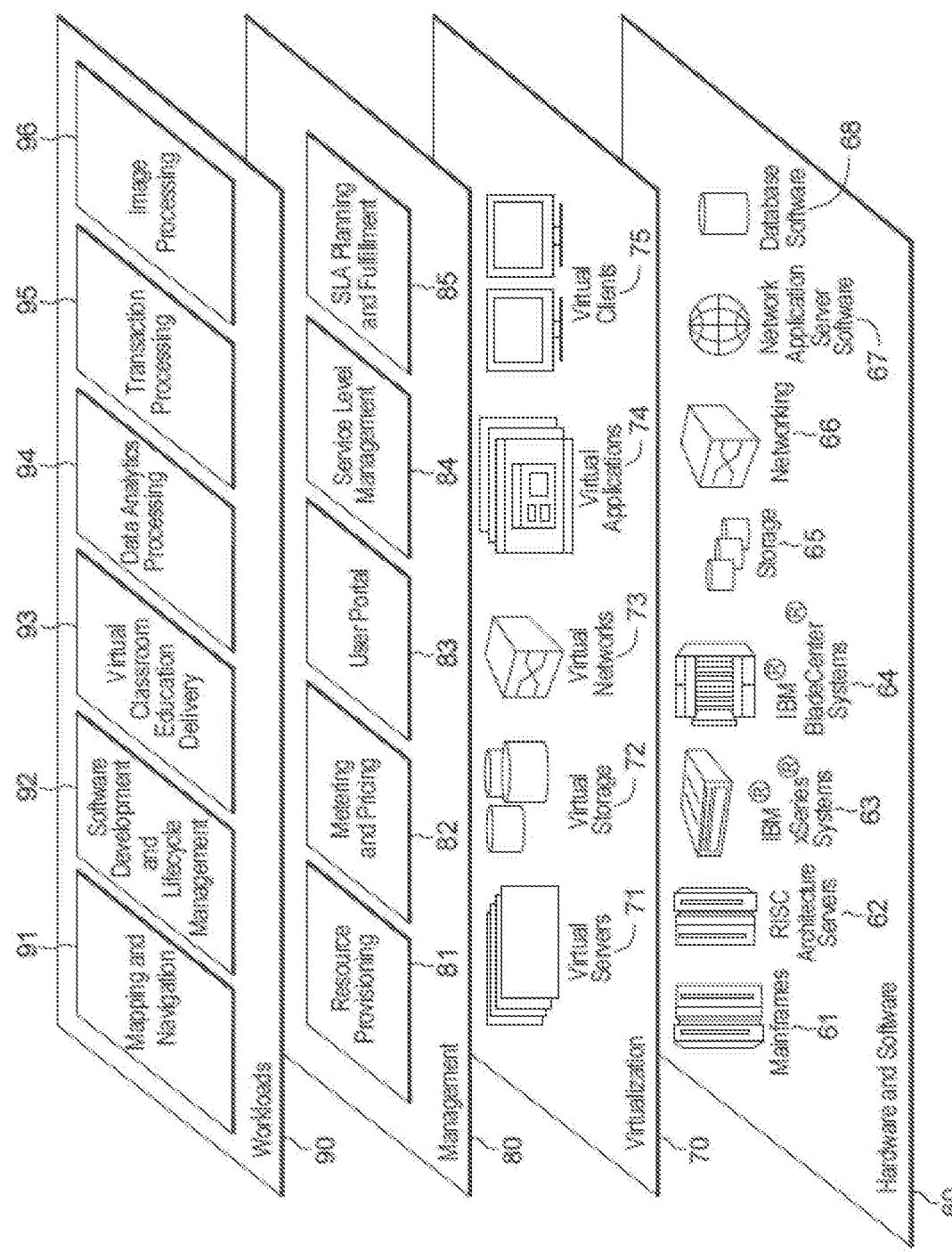
FIG. 8 depicts abstraction model layers according to an embodiment of the present invention.

FIGS. 6-8 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that can be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 can be described in the general context of computer system-executable instructions, such as program processes, being executed by a computer system. Generally, program processes can include routines, programs, objects, components, logic, data structures, and so on that perform particular tasks or implement particular abstract data types. Computer system 12 can be practiced in distributed cloud computing environments where tasks are performed by remote processing devices that are linked through a communications network. In a distributed cloud computing environment, program processes can be located in both local and remote computer system storage media including memory storage devices.

As shown in FIG. 6, computer system 12 in cloud computing node 10 is shown in the form of a general-purpose computing device. The components of computer system 12 can include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media can be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program processes that are configured to carry out the functions of embodiments of the invention.

One or more program 40, having a set (at least one) of program processes 42, can be stored in memory 28 by way of example, and not limitation, as well as an operating system, one or more application programs, other program processes, and program data. Each of the operating system, one or more application programs, other program processes, and program data or some combination thereof, can include an implementation of the real time travel contingency service system 120, the travel contingency service engine 130, and the data miner 160 of FIG. 1, respectively. Program processes 42, as in the travel contingency service engine 130, generally carry out the functions and/or methodologies of embodiments of the invention as described herein.

Computer system 12 can also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and processing components for the travel contingency service engine and the data miner 96, as described herein.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but can also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for providing a real time travel contingency service, comprising:
obtaining, by one or more processor operating a travel contingency service engine that provides the real time travel contingency service, a travel plan of a user including one or more travel item, wherein the user communicates with the travel contingency service engine via a mobile device of the user;
calculating, by the one or more processor, a success value (SV) corresponding to the travel plan, comprising:
assessing a success value of a travel item from the travel plan, based on an order of preference set by the user for the travel item amongst choices from a SV category associated with the travel item as being weighed by a relative significance of the SV category amongst the SV categories in the travel plan, wherein a number of choices present in the SV category is equal to a first positive integer N, a success value of a k-th preferred choice by the user in the SV category is set as (N−k+1), wherein k is a second positive integer less than or equal to N;

iterating the assessing for all of the one or more travel item in the travel plan;

adding respective success values for all travel items in the travel plan as resulting from the iterating; and verifying that values respective to the travel items are within applicable thresholds, by comparing the values respective to the travel items with respective thresholds applicable for the respective travel item, wherein the respective thresholds are associated with respective SV categories, wherein the user sets user preferences on the choices from each of the respective SV categories and user preferences on the respective SV categories in the travel plan via a user interface with the real time travel contingency service on the mobile device;

acquiring, by the one or more processor, real time data relevant to the one or more travel item in the travel plan by use of a data miner mining the real time data from external data sources relevant to the travel plan, the acquiring comprising:

pulling the real time data mined up to a time of disconnection from a data miner of the real time travel contingency service with a time stamp marking a delay, upon ascertaining that one of external data sources of the real time data relevant to the one or more travel item in the travel plan is disconnected from the data miner;

updating, by the one or more processor, the SV corresponding to the travel plan, according to any changes with the one or more travel item as being predicted based on the real time data from the acquiring; and producing, by the one or more processor, the changes and the updated SV corresponding to the travel plan to the user via the mobile device.

2. The computer implemented method of claim 1, further comprising:

ascertaining that the SV subsequent to the updating is less than the SV from the calculating;

generating one or more alternative to a travel item from the one or more travel item, wherein a first success value of the travel item from the updating is less than a second success value of the travel item from the calculating, and wherein respective success values of the one or more alternative to the travel item are greater than the first success value; and replacing, in the travel plan, the travel item with an alternative of the one or more alternative, based on receiving an input from the user that authorizes the alternative to replace the travel item in the travel plan.

3. The computer implemented method of claim 1, the acquiring comprising:

mining the real time data relevant to the one or more travel item in the travel plan by use of a data miner, wherein relevancy is determined based on a time frame, a location, a travel route, local news and weather of the location, and a provider update associated with the respective travel item, as well as choices from the same SV category as the travel item and respective success values thereof.

4. The computer implemented method of claim 1, further comprising:

ascertaining that the SV subsequent to the updating is greater than or equal to the SV from the calculating; and replacing, in the travel plan, the travel item with a predicted change corresponding to the SV from the updating.

5. The computer implemented method of claim 1, further comprising:

ordering, prior to the calculating the SV corresponding to the travel plan, the choices from each of the respective SV categories in each of the respective SV categories corresponding to each travel item based on respective user preferences as input by the user through the user interface with the real time travel contingency service on the mobile device of the user to thereby assign a number of choices in the respective SV categories, denoted as N, to a success value of the most preferred choice in each of the SV categories, to assign respective success values of rest of the choices in the respective categories in decrement by one (1), and to assign one (1) to a success value of the least preferred choice within the respective SV categories.

6. The computer implemented method of claim 1, further comprising:

obtaining, prior to the calculating, an input indicating no preference amongst the choices in a first SV category amongst the SV categories, from the user through the user interface with the real time travel contingency service on the mobile device of the user; and assigning zero (0) to all of the choices in the first SV category to thereby improve a computational efficiency of the real time travel contingency service by eliminating the first SV category from the calculating.

7. The computer implemented method of claim 1, the acquiring comprising:

ascertaining that the mobile device of the user that communicates with the real time travel contingency service had been previously disconnected; and synchronizing the real time data with the mobile device by pushing the real time data as being pulled from the data miner of the real time travel contingency service with a time stamp of the real time data, upon the mobile device being reconnected with the real time travel contingency service.

8. A computer program product comprising:

a computer readable storage medium readable by one or more processor and storing instructions for execution by the one or more processor for performing a method for providing a real time travel contingency service, comprising:

obtaining a travel plan of a user including one or more travel item;

calculating a success value (SV) corresponding to the travel plan, based on how the user prefers each of the one or more travel item amongst choices from respective SV categories corresponding to each travel item, the calculating comprising:

assessing a success value of a travel item from the travel plan, based on an order of preference set by the user for the travel item amongst choices from a SV category associated with the travel item as being weighed by a relative significance of the SV category amongst the SV categories in the travel plan, wherein a number of choices present in the SV category is equal to a first positive integer N, a success value of a k-th preferred choice by the user in the SV category is set as (N−k+1), wherein k is a second positive integer less than or equal to N;

iterating the assessing for all of the one or more travel item in the travel plan;

adding respective success values for all travel items in the travel plan as resulting from the iterating; and verifying that values respective to the travel items are within applicable thresholds, by comparing the values respective to the travel items with respective thresholds applicable for the respective travel item, wherein the respective thresholds are associated with respective SV categories;

acquiring real time data relevant to the one or more travel item in the travel plan by use of a data miner mining the real time data from external data sources relevant to the travel plan, the acquiring comprising:

pulling the real time data mined up to a time of disconnection from a data miner of the real time travel contingency service with a time stamp marking a delay, upon ascertaining that one of external data sources of the real time data relevant to the one or more travel item in the travel plan is disconnected from the data miner;

updating the SV corresponding to the travel plan, according to any changes with the one or more travel item as being predicted based on the real time data from the acquiring; and producing the changes and the updated SV corresponding to the travel plan to the user.

9. The computer program product of claim 8, further comprising:

ascertaining that the SV subsequent to the updating is less than the SV from the calculating;

generating one or more alternative to a travel item from the one or more travel item, wherein a first success value of the travel item from the updating is less than a second success value of the travel item from the calculating, and wherein respective success values of the one or more alternative to the travel item are greater than the first success value; and replacing, in the travel plan, the travel item with an alternative of the one or more alternative, based on receiving an input from the user that authorizes the alternative to replace the travel item in the travel plan.

10. The computer program product of claim 8, wherein N number of choices are present in the SV category, a success value of the most preferred choice is set as N, and a success value of the least preferred choice is set as one (1).

11. The computer program product of claim 8, the updating comprising:

predicting a change on a travel item that is caused by the real time data from the acquiring;

discovering a choice equal to the predicted change in choices of the same SV category as the travel item;

substituting a success value of the predicted change from the same SV category with a success value of the travel item; and adding respective success values for the rest of travel items in the travel plan and the success value of the predicted change from the substituting.

12. The computer program product of claim 8, the acquiring comprising:

mining the real time data relevant to the one or more travel item in the travel plan by use of a data miner, wherein relevancy is determined based on a time frame, a location, a travel route, local news and weather of the location, and a provider update associated with the respective travel item, as well as choices from the same SV category as the travel item and respective success values thereof.

13. The computer program product of claim 8, further comprising:

ascertaining that the SV subsequent to the updating is greater than or equal to the SV from the calculating; and replacing, in the travel plan, the travel item with a predicted change corresponding to the SV from the updating.

14. The computer program product of claim 8, further comprising:

ordering, prior to the calculating the SV corresponding to the travel plan, the choices from each of the respective SV categories in each of the respective SV categories corresponding to each travel item based on respective user preferences as input by the user through a user interface with the real time travel contingency service on a mobile device of the user.

15. The computer program product of claim 8, the acquiring comprising:

ascertaining that a mobile device of the user that communicates with the real time travel contingency service is disconnected; and synchronizing the real time data with the mobile device by pushing the real time data as being pulled from a data miner of the real time travel contingency service with a time stamp marking a delay, upon the mobile device being reconnected with the real time travel contingency service.

16. A system comprising:

a memory;

one or more processor in communication with memory; and program instructions executable by the one or more processor via the memory to perform a method for providing a real time travel contingency service, comprising:

obtaining a travel plan of a user including one or more travel item;

calculating a success value (SV) corresponding to the travel plan, based on how the user prefers each of the one or more travel item amongst choices from respective SV categories corresponding to each travel item, comprising:

assessing a success value of a travel item from the travel plan, based on an order of preference set by the user for the travel item amongst choices from a SV category associated with the travel item as being weighed by a relative significance of the SV category amongst the SV categories in the travel plan, wherein a number of choices present in the SV category is equal to a first positive integer N, a success value of a k-th preferred choice by the user in the SV category is set as (N−k+1), wherein k is a second positive integer less than or equal to N;

iterating the assessing for all of the one or more travel item in the travel plan;

adding respective success values for all travel items in the travel plan as resulting from the iterating; and verifying that values respective to the travel items are within applicable thresholds, by comparing the values respective to the travel items with respective thresholds applicable for the respective travel item, wherein the respective thresholds are associated with respective SV categories;

acquiring real time data relevant to the one or more travel item in the travel plan by use of a data miner mining the real time data from external data sources relevant to the travel plan, the acquiring comprising:

pulling the real time data mined up to a time of disconnection from a data miner of the real time travel contingency service with a time stamp marking a delay, upon ascertaining that one of external data sources of the real time data relevant to the one or more travel item in the travel plan is disconnected from the data miner;

updating the SV corresponding to the travel plan, according to any changes with the one or more travel item as being predicted based on the real time data from the acquiring; and producing the changes and the updated SV corresponding to the travel plan to the user.

* * * * *